United States Patent [19]

Toda et al.

[11] Patent Number: 4,546,398
[45] Date of Patent: Oct. 8, 1985

[54] PERPENDICULAR MAGNETIC RECORDING AND REPRODUCING HEAD

[75] Inventors: Junzo Toda, Kawasaki; Masao Hiyane, Yokohama, both of Japan

[73] Assignee: Fujitsu Limited, Kawasaki, Japan

[21] Appl. No.: 403,727

[22] Filed: Jul. 30, 1982

[30] Foreign Application Priority Data

Jul. 3, 1981 [JP] Japan ................... 56-118525

[51] Int. Cl.$^4$ .................... G11B 5/16; G11B 5/20
[52] U.S. Cl. ..................... 360/126; 360/123
[58] Field of Search ............ 360/126, 123, 125, 119, 360/121, 127, 110, 102, 103; 336/200, 205, 229

[56] References Cited

U.S. PATENT DOCUMENTS

| 4,191,983 | 3/1980 | Gibson | 360/126 |
| 4,219,854 | 8/1980 | Church | 360/123 |
| 4,383,284 | 5/1983 | Isshiki | 360/122 |
| 4,386,383 | 5/1983 | Desserre | 360/126 |
| 4,404,609 | 9/1983 | Jones | 360/126 |
| 4,409,632 | 10/1983 | Kanai | 360/123 |
| 4,438,471 | 3/1984 | Oshiki | 360/125 |

FOREIGN PATENT DOCUMENTS

| 31216 | of 0000 | European Pat. Off. |
| 12912 | of 0000 | European Pat. Off. |
| 2658956 | of 0000 | Fed. Rep. of Germany |
| 2819208 | of 0000 | Fed. Rep. of Germany |
| 1952402 | of 0000 | Fed. Rep. of Germany |
| 2104445 | of 0000 | Fed. Rep. of Germany |
| 52-134706 | of 0000 | Japan |

OTHER PUBLICATIONS

Patents Abstracts of Japan, vol. 4, No. 39, (P-4) [521] Mar. 28th 1980, p. 121 P 4 & JP-A-55 12522, (Fujitsu K.K.), 1-29-1980 * Whole Abstract.
IBM Technical Disclosure Bulletin, vol. 18, No. 1, Jun. 1975, pp. 19-22, Armonk, N.Y., USA, L. T. Romankiw et al.: "Thin Film and Thin-Film/Ferrite Hybrid Magnetic Heads" * p. 19, begin of 1st paragraph-p. 20, end of 3rd paragraph; FIGS. A,B.
IBM Technical Disclosure Bulletin, vol. 23, No. 11, Apr. 1981, pp. 5097-5098, Armonk, N.Y., USA, P. A. Albert et al.: "Method of Forming a Probe-Type Head for Vertical Recording" * p. 5097, begin of last paragraph-p. 5098, end of 1st paragraph; FIGS. 3,4.
IBM Technical Disclosure Bulletin, vol. 15, No. 2, Jul. 1972, pp. 516-517, Armonk, N.Y., USA, R. B. Watrous: "Horizontal Thin-Film Head with Symmetrical Windings" Whole Document.
Patents Abstracts of Japan, vol. 4, No. 131, (P-27) [613], Sep. 13, 1980, p. 163 P 27 & JP-A-55 84015 (Tokyo Shibaura Denki K.K.), 6-24-1980 * Whole Abstract.
Patents Abstracts of Japan, vol. 4, No. 66, (P-11) [548], May 17, 1980, p. 78 P 11 & JP-A-55 34301, (Fujitsu K.K.), 03-10-1980 * Whole Abstract.
Patents Abstracts of Japan, vol. 5, No. 69, (P-60) [741], May 9, 1981, & JP-A-56 19513, (Matsushita Denki Sangyo K.K.), 2-24-1981 * Whole Abstract.
IBM Technical Disclosure Bulletin, vol. 24, No. 4, Sep. 1981, pp. 1931-1932, Armonk, N.Y., USA, T. A. Schwarz: "Perpendicular Recording Read-Write Head with High Reluctance Leg" * p. 1931, paragraphs 1,2,3; figure.
IBM Technical Disclosure Bulletin, vol. 24, No. 8, Jan. 1982, pp. 4034-4035, Armonk, N.Y., USA, T. A. Schwarz: "Vertical Record/Read Magnetic Head" * Whole document.

Primary Examiner—Robert M. Kilgore
Attorney, Agent, or Firm—Staas & Halsey

[57] ABSTRACT

A perpendicular magnetic recording and reproducing head, including: a spiral coil of at least one electrically conductive thin film; and a main pole of a first thin magnetic film having an end for recording and reproducing information, the main pole and the spiral coil being electromagnetically coupled to each other. A perpendicular magnetic head such as this can be easily manufactured, can be adapted not only to floppy disks but also to rigid disks, is suitable for high-frequency operation, and has an improved recording/reproducing efficiency.

14 Claims, 12 Drawing Figures

PERPENDICULAR MAGNETIC RECORDING AND REPRODUCING HEAD

BACKGROUND OF THE INVENTION

1. Field of the Invention

The present invention relates to a perpendicular magnetic recording and reproducing head. More particularly, it relates to a thin film head having a main pole but not having an auxiliary pole, the main pole being easily manufactured and having a high recording/reproducing efficiency.

2. Description of the Prior Art

Conventionally, a perpendicular magnetic head is known which uses an auxiliary pole to magnetize a main pole so as to effect high-density recording and reproducing of information on a medium, for example, a magnetic disk (see Japanese Patent Publciation No. 52-134706 filed on May 6, 1976; inventor: Shunichi Iwasaki). In this conventional perpendicular magnetic head, a main pole, formed from a thin magnetic film made of, for example, permalloy, is placed adjacent to the front surface of a recording medium; and an auxiliary pole, made of ferrite and having a coil wound around it, is placed so that it faces the back surface of the recording medium. By supplying a current to the coil, the auxiliary pole is magnetized and, accordingly, the thin film of the main pole is magnetized by the magnetized auxiliary pole. This results in high-density recording because the medium is magnetized in a direction perpendicular to its surface. When reproducing, variations of the recorded magnetizations in the medium are read by the thin film of the main pole, resulting in variations in the voltage generated between both ends of the coil wound around the auxiliary pole.

The above-mentioned conventional magnetic head, however, has the following disadvantages. Firstly, the inductance of the coil wound around the auxiliary pole is so high that high-frequency operation is difficult. Secondly, since the distance between the main pole and the auxiliary pole is so great, the recording and reproducing efficiency is low. Thirdly, rigid disks cannot be used as the recording medium since they generally are so thick that the distance between the main pole and the auxiliary pole is too great to effect recording or reproducing.

In order to overcome these disadvantages, the use of a main pole without the use of an auxiliary pole may be considered in conjunction with a thin film coil being wound around the main pole. It is, however, difficult to wind a thin film coil around a main pole formed from a thin film, and, also, the number of turns of a thin-film coil is limited, i.e., only a few turns are possible. Therefore, the use of a main pole having a thin-film coil wound around it is not practical.

SUMMARY OF THE INVENTION

Accordingly, an object of the present invention is to provide a perpendicular magnetic recording and reproducing head which is suitable for high-frequency operation.

Another object of the present invention is to provide a perpendicular magnetic recording and reproducing head which can be easily manufactured.

Still another object of the present invention is to provide a perpendicular magnetic recording and reproducing head which has a high recording efficiency.

Still another object of the present invention is to provide a perpendicular magnetic recording and reproducing head in which a rigid disk can be used as the recording medium.

In order to accomplish the above objects, there is provided, according to the present invention, a perpendicular magnetic recording and reproducing head, comprising: a spiral coil consisting of at least one electrically conductive thin film; and a main pole consisting of a first magnetic thin film and having an end for recording and reproducing information, the main pole and the spiral coil being electromagnetically coupled to each other.

According to one aspect of the invention, the perpendicular magnetic recording and reproducing head further comprises an insulating film for covering the spiral coil, the main pole extending under the insulating film and under a half of the spiral coil.

According to another aspect of the invention, the perpendicular magnetic recording and reproducing head further comprises a second thin magnetic film magnetically in contact with the other end of the main pole at the central portion of the spiral coil, the second thin magnetic film extending over the insulating film and at least over the other half of the spiral coil.

According to still another aspect of the invention, the second thin magnetic film extends over the entire diameter of the spiral coil, the main pole and the second thin magnetic film forming a closed flux structure.

According to still another aspect of the invention, the end of the main pole for recording and reproducing information has a width smaller than the width of the other portion of the main pole.

According to still another aspect of the invention, the end of the main pole for recording and reproducing information has a thickness smaller than the thickness of the other portion of the main pole.

According to still another aspect of the invention, the second thin magnetic film has a width larger than the width of the main pole.

According to still another aspect of the invention, the second thin magnetic film has a thickness larger than the thickness of the main pole.

According to still another aspect of the invention, the spiral coil comprises one electrically conductive thin film spirally formed in a plane.

According to still another aspect of the invention, the spiral coil comprises a number of stacked thin circular films, each of the stacked thin circular films being insulated by the insulating film.

According to still another aspect of the invention the reproducing head comprises: a spiral coil consisting of at least one electrically conductive thin film; a main pole consisting of a first thin magnetic film and having an end for recording information, the main pole and the spiral coil being electromagnetically coupled to each other; and a magnetoresistive element for reproducing information.

BRIEF DESCRIPTION OF THE DRAWINGS

The above objects and features of the present invention will be better understood from the following description of the embodiments, as compared with the conventional magnetic head, with reference to the accompanying drawings, in which.

DESCRIPTION OF THE PREFERRED EMBODIMENTS

Figure 1:
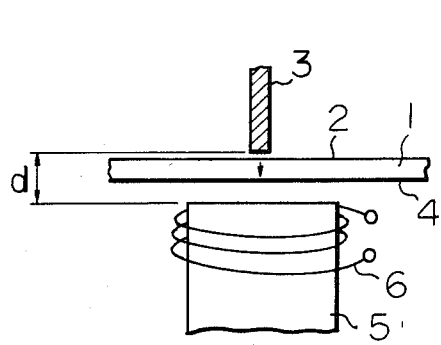
FIG. 1 is a side view of a conventional perpendicular magnetic head having an auxiliary pole.

Before describing the embodiments of the present invention, a conventional example will first be described with reference to FIG. 1. In FIG. 1 a recording medium 1 has a recording surface 2 and a back surface 4. A main pole 3, made of a thin magnetic film, for example, permalloy, has an end portion which is placed so as to face recording surface 2 of recording medium 1. An auxiliary pole 5 is placed having an end near the back surface of the recording medium 1 so as to face back surface 4 of medium 1. Auxiliary pole 5 has a large volume in comparison with main pole 3 and has a coil 6 wound around it. By supplying a current to coil 6, auxiliary pole 5 is magnetized and main pole 3 is magnetized by magnetized auxiliary pole 5. Since main pole 3 is a thin film, it is strongly magnetized, and, therefore, recording surface 2 of recording medium 1 is magnetized in a direction perpendicular to the surface of recording medium 1, resulting in high-density recording. During reproduction recording medium 1 moves past the gap between the poles and variations of the recorded magnetizations in recording medium 1 are transferred to main pole 3. The variations of the magnetizations in main pole 3 then cause variations of the voltage between both ends of coil 6 wound around auxiliary pole 5. Thus, the information recorded in medium 1 can be read out.

The above-mentioned conventional magnetic head of FIG. 1, however, has the following disadvantages. Firstly, since coil 6 is wound around auxiliary pole 5 having a the inductance of coil 6 becomes so high that the response during a high-frequency recording or reproducing operation is delayed too much. Secondly, since main pole 3 and auxiliary pole 5 are separated by distance d, which is generally greater than the thickness of recording medium 1, the distance between main pole 3 and auxiliary pole 5 is so great that the recording and reproducing efficiency is low. Therefore, rigid disks made of, for example, aluminum cannot be used as recording medium 1 in the recording system of FIG. 1 since they have a thickness of about several millimeters and, therefore, the distance between main pole 3 and auxiliary pole 5 would be too great to effect a recording or reproducing operation. Further, if a thin rigid disk is used as recording medium 1, and if the thin rigid disk is made of a metal, for example, aluminum, magnetic eddy currents would be produced on the surface of the rigid disk by a large-volume auxiliary pole 5, thereby causing a decrease in the recorded magnetization of the rigid disk. Therefore, metal disks cannot be used as a recording medium 1 in the recording system of FIG. 1. Only floppy disks having a thickness of about 50 $\mu$m through 100 $\mu$m can be used, but they also produce a low recording or reproducing efficiency.

Figure 2:
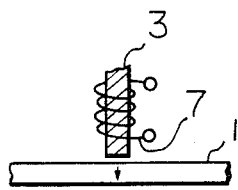
FIG. 2 is a side view of an imaginary proposed perpendicular magnetic head having a main pole only.

In order to overcome these disadvantages in the magnetic head of FIG. 1, a thin film head having a main pole, but not having an auxiliary pole, such as that illustrated in FIG. 2 may be considered. In FIG. 2, auxiliary pole 5 of FIG. 1 is not used. Instead, main pole 3 has a coil 7 wound around it. If coil 7 is windings of wire, the inductance of coil 7 will also become high, resulting in a low-response speed during high-frequency operation. Therefore, coil 7 must be made by winding thin films and then stacking the thin films around main pole 3. The manufacturing steps for stacking the thin films around main pole 3 are very complicated, and, thus, it is difficult to manufacture the magnetic head of FIG. 2.

Embodiments of the present invention will be described with reference to FIGS. 3 through 12.

Figure 3:
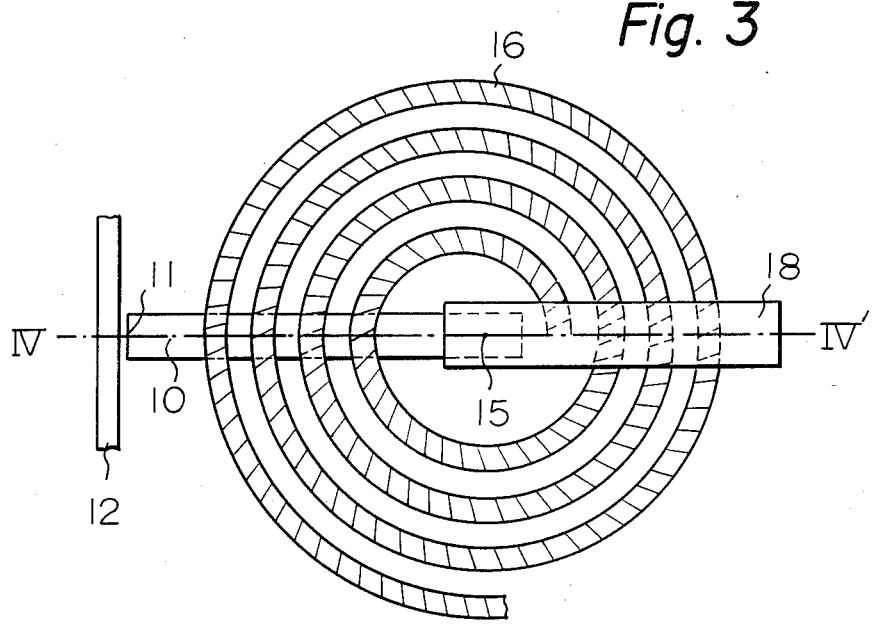
FIG. 3 is a plan view of a perpendicular magnetic recording and reproducing head according to a first embodiment of the present invention.
Figure 4:
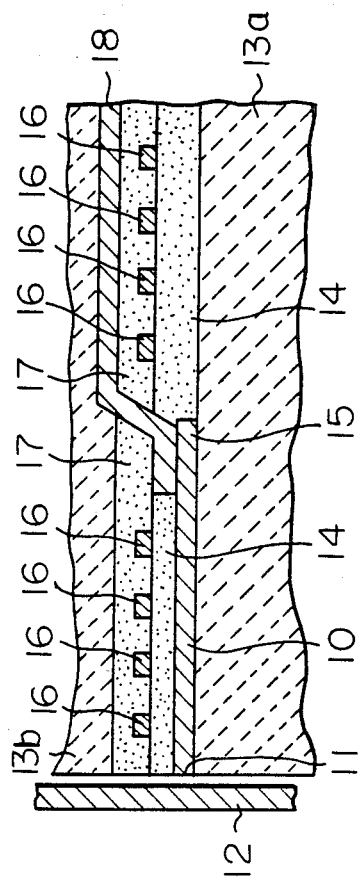
FIG. 4 is a cross-sectional view taken along line IV—IV' of FIG. 3.

FIGS. 3 and 4 illustrate the first embodiment of the present invention. In FIG. 3, a main pole (or monomagnetic main pole) 10 is formed from a first thin magnetic film made, for example, of permalloy; an end 11 of main pole 10 is for recording and reproducing information. A recording medium 12, having a recording surface, is, for example, a floppy disk or a rigid disk made of aluminum on which a thin magnetic film is deposited. A spiral coil 16 is made of a thin metal film, for example, copper or aluminum and is formed by an evaporating, sputtering, or plating technique. The center of spiral coil 16 is 15. A second thin magnetic film 18 is in magnetic contact with main pole 10 at center 15 of spiral coil 16. End 11 of main pole 10 is placed near the surface of recording medium 12. End 11 of main pole 10 may alternatively be placed in contact with the surface of recording medium 12. Center 15 of spiral coil 16 is placed at the other end of main pole 10. The main pole 10 generates a magnetic flux which is perpendicular to the surface of the recording medium 12.

In FIG. 4, main pole 10 is formed on a substrate 13a made of inorganic material, for example, ceramic material or glass. Main pole 10 and the surface of substrate 13a are covered with a first insulating layer 14. Spiral coil 16 is placed on first insulating layer 14. Spiral coil 16 has a number of turns but, in this embodiment, is formed by one metal layer. That is, spiral coil 16 does not have a stacked structure, i.e., a multilayer structure. Spiral coil 16 is covered with a second insulating film 17, which is formed on first insulating film 14. At the central portion of spiral coil 16, near center 15, a contact window is formed through first insulating layer 14 and second insulating film 17. In the contact window, main pole 10 is in contact with second thin magnetic film 18. Second thin magnetic film 18 extends in the direction opposite to the extending direction of main pole 10. Second insulating film 17 and second thin magnetic film 18 are covered with protective film 13b made of inorganic material, for example, ceramic material or glass. Assuming that, with respect to center 15 of spiral coil 16, the portion of spiral coil 16 nearest to recording medium 12 is the front portion of spiral coil 16 and that the portion of spiral coil 16 farthest from recording medium 12 is the rear portion of spiral coil 16, main pole 10 is magnetized by the front portion of spiral coil 16, and second thin magnetic film 18 is magnetized by the rear portion of spiral coil 16 when a current is supplied to spiral coil 16. This is apparent from FIGS. 3 and 4.

Figure 5:
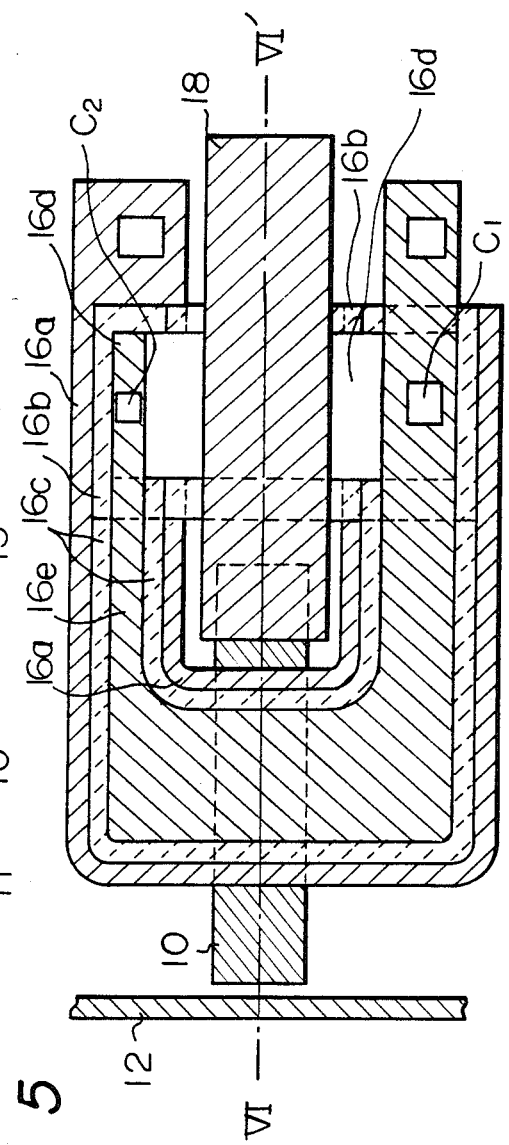
FIG. 5 is a plan view of a perpendicular magnetic recording and reproducing head according to a second embodiment of the present invention.
Figure 6:
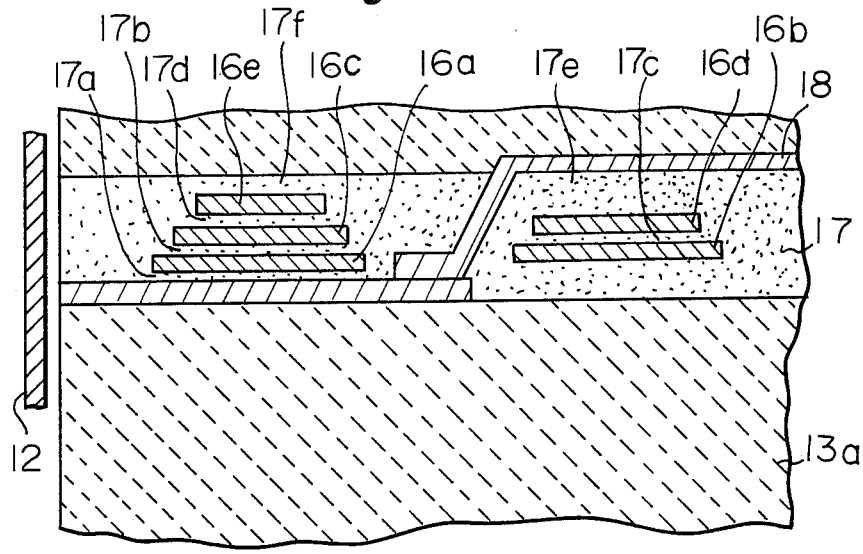
FIG. 6 is a cross-sectional view taken along line VI—VI' of FIG. 5.

A second embodiment of the invention is described with reference to FIGS. 5 and 6. In this embodiment, briefly, the spiral coil has a stacked structure, i.e., a multilayer structure. That is, the spiral coil has a number of turns which are stacked by employing a plurality of metal films. Between the metal films, an insulating film is provided. More precisely, in FIGS. 5 and 6, a first U-shaped metal film 16a is placed in the lowest portion of the spiral coil and is formed on a first insulating film 17a, the first U-shaped metal film 16a being covered with a second insulating film 17b. A first rectangular metal film 16b is in contact with one end of U-shaped metal film 16a at contact point $C_1$. The first rectangular metal film 16b is covered with a third insulating film 17c. A second U-shaped metal film 16c is in contact with the first rectangular metal film 16b at contact point $c_2$. The second U-shaped metal film 16c is formed on a second insulating film 17b and is covered with a fourth insulating film 17d. A second rectangular metal film 16d is in contact with second U-shaped metal film 16c at contact point $c_1$. The second rectangular metal film 16d is formed on a third insulating film 17c and is covered with a fifth insulating film 17e. A third U-shaped metal film 16e is in contact with the second rectangular metal film 16d at contact point $c_2$. The third U-shaped metal film 16e is formed on a fourth insulating film 17d and is covered with a sixth insulating film 17f.

In such a manner as described above with reference to FIGS. 5 and 6, a spiral coil having a stacked structure can be obtained.

The spiral coil may alternatively be formed as a helix.

By forming such a spiral coil so that it has a single layer structure, a multilayer structure, or a helical structure, the process of winding the coil around the main pole is not necessary. Therefore, such a spiral coil is suitable for the manufacture of a thin-film head, and a coil having a large number of turns can be easily manufactured.

Figure 7:
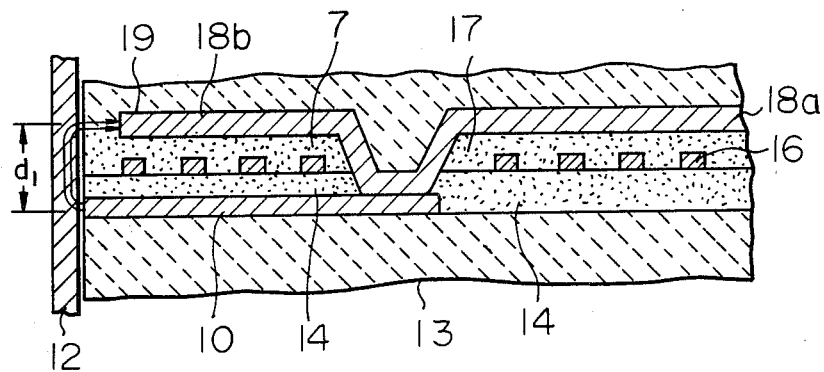
FIG. 7 is a cross-sectional view of a perpendicular magnetic recording and reproducing head according to a third embodiment of the present invention.

A third embodiment of the invention is described with reference to FIG. 7. The difference between FIG. 4 and FIG. 7 is that in FIG. 7, the second thin magnetic film is extended to cover not only the rear portion but also the front portion of spiral coil 16. In FIG. 7, the rear portion and the front portion of the second thin magnetic film are denoted by 18a and 18b, respectively. A front end 19 of front portion 18b of the second thin magnetic film is not exposed at the front surface of the head, which faces the recording medium; therefore, the front end 19 does not record or reproduce. Due to the structure of FIG. 7 (the distance $d_1$ between the front end of main pole 10 and front end 19 of front portion 18b of the second thin magnetic film is very short), the magnetic resistance is decreased and, accordingly, almost all of the magnetic flux from the front end of main pole 10 go to front end 19 of front portion 18b of the second thin magnetic film.

Figure 8:
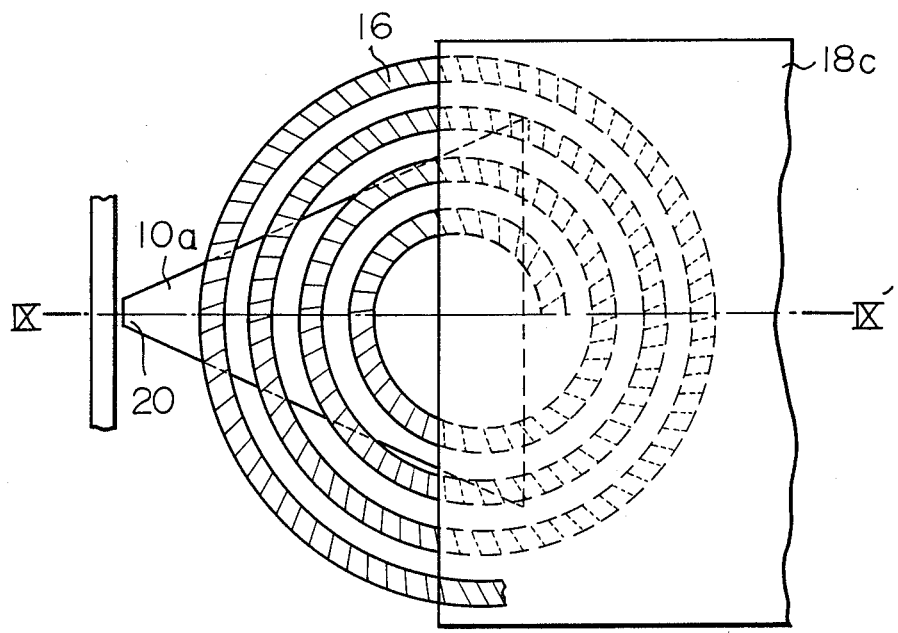
FIG. 8 is a plan view of a perpendicular magnetic recording and reproducing head according to a fourth embodiment of the present invention.
Figure 9:
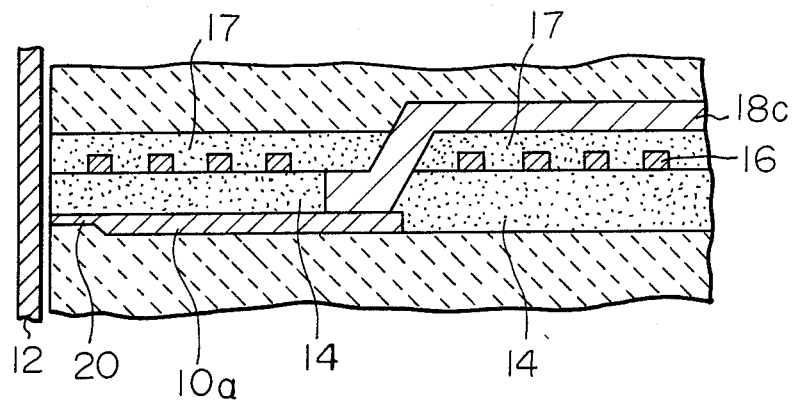
FIG. 9 is a cross-sectional view taken along line IX—IX' of FIG. 8.

A fourth embodiment of the present invention is described with reference to FIGS. 8 and 9. The difference between FIGS. 3 and 4 and FIGS. 8 and 9 is that in FIGS. 8 and 9 both the width and the thickness of main pole 10a at its front portion 20 are smaller than those at its rear portion; and both the width and the thickness of second thin magnetic film 18c are greater than those of main pole 10a. Due to this structure, a stronger magnetic field is generated at the narrower and thinner front portion 20 of main pole 10a during recording, resulting in an improved recording characteristic. Also, since main pole 10a and second thin magnetic film 18c are wider and thicker at the rear portion, leakage of the magnetic flux is decreased during reproduction, resulting in an improved reproduction efficiency.

Figure 10:
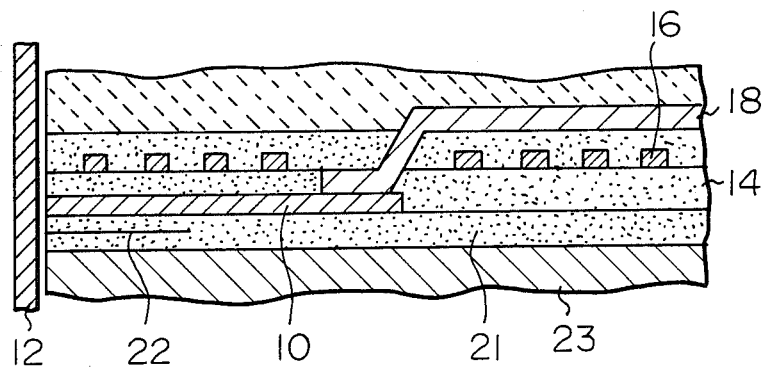
FIG. 10 is a cross-sectional view of a perpendicular magnetic recording and reproducing head according to a fifth embodiment of the present invention.

A fifth embodiment is described with reference to FIG. 10. The difference between FIG. 4 and FIG. 10 is that, in FIG. 10, a third insulating film 21 is provided under main pole 10 and under a first insulating film 14, and a magneto-resistive (MR) element 22 is provided in third insulating film 21. The front end of MR element 22 is exposed so as to face recording medium 12. As is well known, a MR element, made of, for example, permalloy, has a very thin thickness, about 500 angstroms, and, is used only for reproducing information. Under third insulating film 21, magnetic material of a ferrite substrate 23 is formed. Main pole 10 and ferrite substrate 23 act as shield layers for MR element 22. In the structure of FIG. 10, main pole 10 is used only for recording and MR element 22 is used only for reproduction. Since MR element 22 is thinner than main pole 10, the reproduction of information recorded at a high density is easily realized.

Figure 11:
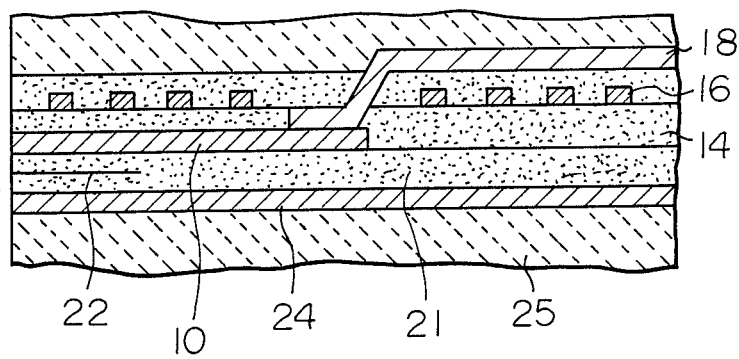
FIG. 11 is a cross-sectional view of a perpendicular magnetic recording and reproducing head according to a sixth embodiment of the present invention.

A sixth embodiment is described with reference to FIG. 11. The difference between FIG. 10 and FIG. 11 is that in FIG. 11, in place of ferrite substrate 23, a third thin magnetic film 24 is formed under third insulating film 21, and under third thin magnetic film 24, nonmagnetic inorganic substrate 25 is provided. Third thin magnetic film 24 also acts as a shield layer for MR head 22. Due to this structure, the same effects as in the fifth embodiment of FIG. 11 are obtained.

The structures of FIGS. 10 and 11 can also be easily manufactured since the manufacturing steps comprise a conventional technique for forming an inductive thin film head.

Although second thin magnetic film 18 is magnetically coupled to the rear portion of spiral coil 16, provided in the first embodiment illustrated in FIGS. 3 and 4, second thin magnetic film 18 may alternatively be omitted according to the present invention. When second thin magnetic film 18 is provided, the rear portion of spiral coil 16 increases the magnetic flux in main pole 10, resulting in an improved recording and reproducing efficiency.

Further, a spiral coil or a helical coil may be provided not only on one side of main pole 10 but may alternatively be provided on the other side of main pole 10 as well. Also, a spiral coil may alternatively be provided on each side of main pole 10 so as to increase the recording/reproducing efficiency.

Figure 12:
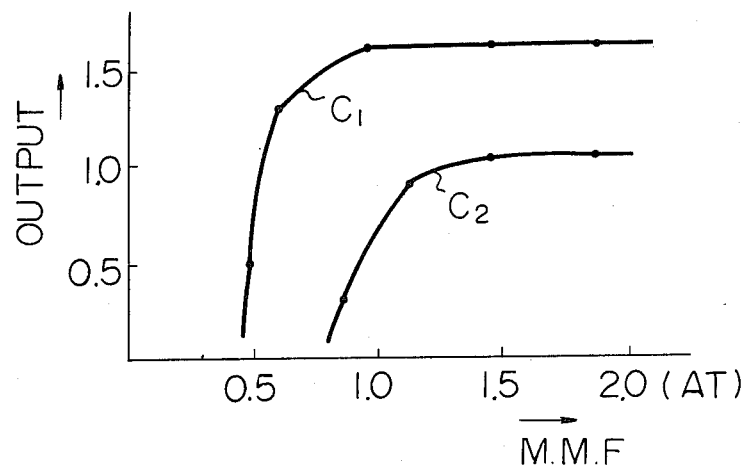
FIG. 12 is a graph illustrating the recording and reproducing characteristics of the magnetic head of FIGS. 3 and 4.

FIG. 12 shows two experimental curves $c_1$ and $c_2$. Curve $c_1$ represents the recording and reproducing characteristics when second thin magnetic film 18 is provided as in the first embodiment illustrated in FIGS. 3 and 4, and curve $c_2$ shows the recording and reproducing characteristics when second thin magnetic film 18 is not provided in the structure of FIGS. 3 and 4. In both cases, a floppy disk, having a 0.5 μm thick cobalt-chromium alloy film and an underlayered 0.5 μm thick nickel-iron alloy film is rotated at a velocity of 2 m/s. The horizontal axis represents the magneto-motive force which is supplied to spiral coil 16, and the vertical axis represents the reproduced output which is normalized by the saturation output when second magnetic film 18 is not provided. As will be apparent from FIG. 12, the magneto-motive force necessary to get a saturation output decreases by about 60% which the second thin magnetic film 18 is used. The reproduced output also increases by about 60%.

The recording and reproducing characteristics are expressed as follows according to the experimental results.

FLOPPY DISK (Co..Cr 0.5 μm, Ni.Fe 0.5 μm) V=2 m/s

1. Recording Characteristics
   a. An auxiliary pole was used as in the conventional example of FIG. 1 (first example) ... $I_{90}=5.0$ AT
   b. Only a main pole, without a second thin magnetic film 18, was used (second example) ... $I_{90}=1.2$ AT
   c. Only a main pole and a second thin magnetic film 18 were used as in the first embodiment of FIG. 3 (third example) ... $I_{90}=0.7$ AT
2. Reproducing Characteristics
   a. The first example ... $V_0=0.06$ $\mu V_{p-p}/\mu m$.turn
   b. The second example ... $V_0=0.08$ $\mu V_{p-p}/\mu m$.turn
   c. The third example ... $V_0=0.13$ $\mu V_{p-p}/\mu m$.turn RIGID DISK (Co..Cr 0.5 μm, Ni.Fe 0.5 μm) V=6 m/s 1. Recording Characteristics
   a. Only a main pole and a second thin magnetic film 18 were used, the front end of the main pole being narrower and thinner as in the fourth embodiment of FIG. 9 (fourth example) ... $I_{90}=0.42$ AT
   b. Only a main pole and a second thin magnetic film 18 were used under the same condition as above and a second thin magnetic film 18 was extended to the front portion of the main pole as in a combination of the third embodiment of FIG. 7 and the fourth embodiment of FIG. 9 (fifth example) ... $I_{90}=0.39$ AT
2. Reproducing Characteristics
   The fourth example ... $V_0=0.8$ $\mu V_{p-p}/\mu m$.turn
   The fifth example ... $V_0=1.0$ $\mu V_{p-p}/\mu m$.turn In the above experimental results, $I_{90}$ is the current supplied to the spiral coil when a 90% value of a saturation output is obtained; AT is ampere turns; $V_0$ is the peak-to-peak output voltage obtained in the spiral coil; and $\mu V_{p-p}/\mu m$.turn is the unit of the output voltage represented by micron volts per 1 μm of the track width of the recording medium and per one turn of the spiral coil.

As will be apparent from the above experimental results, the recording/reproducing characteristics are greatly improved according to the present invention.

The present invention is not restricted to the above-described embodiments, and various changes and modifications are possible without departing from the spirit of the present invention. For example, various combinations of the above embodiments are possible.

From the foregoing description, it will be apparent that, according to the present invention, by forming a thin-film spiral coil having a number of turns near the main pole, a perpendicular magnetic recording and reproducing head can be obtained which can be easily manufactured, which is suitable for high-frequency operation, which has a high recording/reproducing efficiency, and with which a rigid disk can be used as a recording medium.

We claim:

1. A perpendicular magnetic recording and reproducing head for recording information on and reproducing information from a recording medium having a recording surface, comprising:
   a first thin magnetic film in substantially perpendicular relation with the recording surface, the first thin magnetic film having a first end, adjacent to the recording surface, which generates a magnetic flux perpendicular to the surface of the recording medium for recording and reproducing information and a second end;
   a second thin magnetic film having a first portion in substantially parallel relation with the first thin magnetic film and a second portion connected to the second end of the first thin magnetic film; and
   a thin film coil, disposed in a plane which is substantially parallel to the first thin magnetic film and the first portion of the second thin magnetic film, the thin film coil having a center adjacent to the second end of the first thin magnetic film.

2. A perpendicular magnetic recording and reproducing head according to claim 1, wherein the thin film coil is a spiral coil and the first thin magnetic film is a monomagnetic main pole.

3. A perpendicular magnetic recording and reproducing head according to claim 2, further comprising an insulating film formed between the spiral coil and the main pole and between the spiral coil and the second thin magnetic film.

4. A perpendicular magnetic recording and reproducing head according to claim 3, wherein the second thin magnetic film has a third portion extending over and in substantially parallel relation to the main pole on the opposite side of the spiral coil from the main pole, the insulating film is formed between the spiral coil and the third portion of the second thin magnetic film and wherein the main pole and the second thin magnetic film form a closed flux structure.

5. A perpendicular magnetic recording and reproducing head according to claim 3, wherein the main pole has a cross-sectional area and wherein the first end of the main pole has a cross-sectional area which is smaller than the cross-sectional area of the portion of the main pole other than the first end.

6. A perpendicular magnetic recording and reproducing head according to claim 3, wherein the main pole has a cross-sectional area, the second thin magnetic film has a cross-sectional area, and wherein the cross-sectional area of the second thin film is larger than the cross-sectional area of the main pole.

7. A perpendicular magnetic recording and reproducing head according to claim 1, 2, 3, 4, 5 or 6, wherein said spiral coil comprises one electrically conductive thin film spirally formed in a plane.

8. A perpendicular magnetic recording and reproducing head according to claim 1, 2, 3, 4, 5 or 6, wherein said spiral coil comprises a number of stacked thin films each of said stacked thin films being insulated by said insulating film, and each of said thin films having a contact point, said contact point electrically connecting said stacked films.

9. A perpendicular magnetic recording and reproducing head according to claim 1, 2, 3, 4, 5 or 6, wherein said spiral coil comprises one electrically conductive thin film formed in a helix and wherein the turns of said helix are insulated by said insulating film.

10. A perpendicular magnetic recording and reproducing head for recording and reproducing information from a recording medium having a recording surface, comprising:
- a first thin magnetic film in substantially perpendicular relation with the recording surface, the first thin magnetic film having a first end, adjacent to the recording surface, which generates a magnetic flux perpendicular to the surface of the recording medium for recording information, and a second end;
- a second thin magnetic film having a first portion in substantially parallel relation with the first thin magnetic film and a second portion connected to the second end of the first thin magnetic film; and
- a magneto resistive element, in substantially parallel relation to the first thin magnetic film, for reproducing information; and
- a thin film coil, disposed in a plane which is substantially parallel to the first thin magnetic film and the first portion of the second thin magnetic film, the thin film coil having a center adjacent to the second end of the first thin magnetic film.

11. A perpendicular magnetic recording and reproducing head according to claim 10, wherein the thin film coil is a spiral coil and the first thin magnetic film is a main mono-magnetic pole.

12. A perpendicular magnetic recording and reproducing head according to claim 11, further comprising an insulating film formed between the spiral coil and the main pole, between the spiral coil and the second thin magnetic film and between the main pole and the magneto resistive element.

13. A perpendicular magnetic recording and reproducing head according to claim 11, wherein the second thin magnetic film has a third portion extending over and in substantially parallel relation to the main pole on the opposite side of the spiral coil from the main pole, the insulating film is formed between the spiral coil and the third portion of the second thin magnetic film and wherein the main pole and the second thin magnetic film form a closed flux structure.

14. A perpendicular magnetic recording and reproducing head according to claim 12, further comprising a third thin magnetic film in substantially parallel relation to the main pole and the magneto resistive element, wherein the insulating film is formed between the magnetic resistive element and the third thin magnetic film.

* * * * *